US010763665B2

(12) United States Patent
Schneider et al.

(10) Patent No.: US 10,763,665 B2
(45) Date of Patent: Sep. 1, 2020

(54) OVERVOLTAGE PROTECTION CIRCUIT

(71) Applicant: ebm-papst Mulfingen GmbH & Co.KG, Mulfingen (DE)

(72) Inventors: Fabian Schneider, Rot am See (DE); Daniel Koenig, Gerabronn (DE)

(73) Assignee: ebm-papst Mulfingen GmbH & Co.KG, Mulfingen (DE)

( * ) Notice: Subject to any disclaimer, the term of this patent is extended or adjusted under 35 U.S.C. 154(b) by 253 days.

(21) Appl. No.: 15/578,553

(22) PCT Filed: May 24, 2016

(86) PCT No.: PCT/EP2016/061672
§ 371 (c)(1),
(2) Date: Nov. 30, 2017

(87) PCT Pub. No.: WO2016/193059
PCT Pub. Date: Dec. 8, 2016

(65) Prior Publication Data
US 2018/0175616 A1    Jun. 21, 2018

(30) Foreign Application Priority Data

Jun. 1, 2015    (DE) .......................... 10 2015 108 652

(51) Int. Cl.
*H02H 9/06* (2006.01)
*H02H 9/04* (2006.01)
(Continued)

(52) U.S. Cl.
CPC ............. *H02H 9/041* (2013.01); *H01J 17/34* (2013.01); *H01T 1/14* (2013.01); *H01T 4/20* (2013.01);
(Continued)

(58) Field of Classification Search
USPC .......................................... 361/117–120, 127
See application file for complete search history.

(56) References Cited

U.S. PATENT DOCUMENTS 3,418,530 A * 12/1968 Cheever ................. H02H 3/023
361/56
4,004,193 A * 1/1977 Reckard ................... H02H 9/06
361/130

(Continued)

FOREIGN PATENT DOCUMENTS

| CH | 596682 A5 | 3/1978 |
| DE | 3834514 A1 | 4/1990 |
| DE | 102007007921 A1 | 8/2008 |

OTHER PUBLICATIONS

International Search Report dated Jul. 21, 2016 issued in PCT/EP2016/061672.

*Primary Examiner* — Danny Nguyen
(74) *Attorney, Agent, or Firm* — Scully Scott Murphy and Presser

(57) ABSTRACT

The present invention relates to an overvoltage protection circuit (1) for protecting the electronics of a motor, in particular of an EC motor, against overvoltage pulses, with two protective devices (FS1, FS2) arranged in series connection between two connections (10, 20), wherein a resistor (R1) or (R2) is connected in parallel to each of the protective devices (FS1, FS2) and at least one capacitive element (C1) is provided in parallel connection to the first protective device (FS1), wherein the overvoltage protection circuit (1) has, between the connections (10, 20), at least a first (lower) and a second (higher) breakdown voltage point at a voltage $U_{Z1}$ or $U_{Z2}$ dependent on the voltage change over time $k=(dU/dt)$ of a voltage $U_{GA}$ at the connections (10, 20).

6 Claims, 4 Drawing Sheets

(51) Int. Cl.
  *H01T 15/00* (2006.01)
  *H01J 17/34* (2006.01)
  *H01T 1/14* (2006.01)
  *H01T 4/20* (2006.01)
  *H02H 7/09* (2006.01)
  *H01T 4/02* (2006.01)
(52) U.S. Cl.
  CPC ............... *H01T 15/00* (2013.01); *H02H 7/09* (2013.01); *H02H 9/06* (2013.01); *H01T 4/02* (2013.01); *H02H 9/042* (2013.01); *H02H 9/046* (2013.01)

(56) References Cited

U.S. PATENT DOCUMENTS

| | | | |
|---|---|---|---|
| 4,158,872 A | 6/1979 | Stephanides | |
| 2008/0122573 A1 | 5/2008 | Ulaner et al. | |
| 2009/0154034 A1* | 6/2009 | Tallam | H02H 9/06 361/56 |
| 2009/0213504 A1* | 8/2009 | Hallstrom | H01T 2/02 361/16 |
| 2011/0299203 A1* | 12/2011 | Ruess | H02H 9/042 361/56 |
| 2016/0087424 A1* | 3/2016 | Skinner | H02H 7/09 361/91.1 |

* cited by examiner

OVERVOLTAGE PROTECTION CIRCUIT

The invention relates to an overvoltage protection circuit for protecting the electronics of a motor, in particular of an EC motor, against overvoltage pulses, and to a corresponding method to this effect.

Protective devices for protecting the circuits or the inverters for motors, in particular EC motors, are known in different embodiments in the prior art. Thus, inverters comprising a rectifier for generating a unipolar intermediate circuit voltage from a three-phase grid voltage, in particular, from a three-phase voltage, an intermediate circuit capacitor which is connected to the intermediate circuit voltage, and a final stage comprising a power switch are also sufficiently known.

Thus, DE 102007007921 A1 concerns the protection against overvoltages given that as intermediate circuit capacitors, electrolytic capacitors are usually employed, which are used to buffer the energy of the intermediate circuit and of the intermediate circuit voltage. The disadvantage here is that, in the current prior art, the capacitance of the intermediate circuit capacitor is greater than what is functionally necessary. What is functionally necessary in this context is, in particular, sufficient smoothing during operation at nominal load. Thus, in the prior art, the capacitance cannot be selected based on functional requirements, but must instead be selected based on structural requirements such as lifespan and current carrying capacity.

For the protection against overvoltages, DE 102007007921 A1 proposes to additionally connect in parallel a circuit portion to the intermediate circuit capacitor, which consists of a voltage splitter, in particular of a resistive, capacitive and/or complex voltage splitter, in the lower branch of which a varistor is arranged, and in the upper branch of which a gas discharge tube is arranged connected in parallel connection.

However, in gas discharge tubes such as those typically used in the prior art, the following problems occur inter alia. Using a gas discharge tube, for example, at the neutral point of a varistor circuit (20) in the input filter (30) for three-phase supplied EC motor electronics with a higher breakdown voltage than the voltage for carrying out the high-voltage test (in order to circumvent an otherwise manual separation of the protective device during this test) results in a reduced protective action against overvoltage pulses (surge pulses), since the gas discharge tube in this case also ignites only at the higher voltage, leading thus to increased energy reduction or absorption in the subsequent construction elements of the electronics.

Below the ignition voltage of the gas discharge tube, the component connected in parallel relative to the protective line has the characteristic of an insulator and does not influence said protective line. However, starting at a component-specific ignition voltage, a gas discharge ignites in the gas discharge tube, and the terminal voltage on it is reduced within a few microseconds by flow through an arc discharge (electric arc ignition). In contrast to other overvoltage arresters such as suppressor diodes or varistors, for example, the terminal voltage thus drops far below the nominal voltage, which is equivalent to a short circuit in grid applications. Gas discharge tubes moreover react more slowly than varistors or suppressor diodes, but are capable of discharging high pulse energies. Corresponding designs exist for the desired ignition voltages. The actual ignition voltage, in the case of steep pulses, i.e., in the case of a rapid voltage increase, is far above the nominal value. While the current flows after the response, a burning voltage is generated.

Apparatuses of protection classes I and II used for the technical test are checked with a high-voltage test, in order to determine whether the insulation has a dielectric strength as specified in accordance with the product-specific standard. In the process, it is determined whether the insulation of the current-carrying conductor and the safe distance from the housing are in order. In principle, this high-voltage test is carried out on the same connection sites as in the insulation resistance test. However, the test is carried out with higher test voltages than the operating voltages occurring in normal operation. The test voltage can be either an alternating current voltage or a direct current voltage and, typically, it is the range of a few kilovolts.

If, accordingly, the breakdown voltage is greater than the voltage for carrying out the high-voltage test and if an increased energy reduction thus occurs, or in the case of absorption of undesired electrical energy in the succeeding construction elements, then said construction elements may be loaded more strongly than necessary by overvoltage or overcurrent and possibly be destroyed, which considerably increases the difficulty of successful passing of the surge voltage test (surge test), particularly in the case of high required test voltages. The desired protective effect of the gas discharge tubes is thus not due to the high breakdown voltage required exclusively for the high-voltage test.

The invention accordingly consists in providing suitable protection of electronics against overvoltage pulses (surge test) by protective devices such as, for example, gas discharge tubes, with simultaneous possibility of a high-voltage testability. Since, in the case of the high-voltage test, the electrical strength of the apparatus is tested by the application of a (slowly) increasing test voltage over a defined voltage ramp up to a predetermined test voltage, the test is considered to have been passed if no corresponding current flow is detected. However, if, in the electronics, protective elements such as, for example, gas discharge tubes are present, they must be dimensioned in such a manner that they do not respond (ignite) during the test in the case of a slow voltage increase, because the test will otherwise be evaluated as failed.

Thus, the protective elements usually must be designed with an increased voltage strength (breakdown voltage), as a result of which, however, the desired protection can no longer be achieved. The breakdown voltage is then disadvantageously above the test voltage and thus also far above the voltage strength required for the normal operation of the electronics.

On the other hand, in the surge test, as early and rapid a response of the gas discharge tube as possible is desirable, in order to optimally take into consideration the protection function which is actually desired, i.e., the energy absorption in the case of occurrence of an overvoltage pulse.

Therefore, the invention is based on the aim of overcoming the above-mentioned disadvantages and providing a protection circuit for protecting against overvoltages, which provides improved protection for motor electronics and at the same time allows a high-voltage test for testing the insulation strength.

The underlying idea of the invention is to provide a circuit arrangement with two protective devices (preferably gas discharge tubes) arranged in series connection, with two parallel resistors, as well as with at least one capacitive element (preferably a capacitor) connected in parallel to a protective device, wherein the control of the breakdown voltage of the overall arrangement occurs depending on the edge slope of a voltage applied between the connection terminals of the circuit, i.e., the voltage starting at which an electric arc is ignited in one or both gas discharge tubes, and thus the voltage between the terminals is limited to the correspondingly lower burning voltage of the electric arcs in the gas discharge tubes. Thus, in the case of a slow increase of the voltage, as occurs in accordance with the intended use, for example, in the case of a performed high-voltage test performed on the apparatus, a high breakdown voltage $U_{Z2}$ will be achieved, which corresponds preferably to the sum of the individual ignition voltages of the protective devices. On the other hand, in the case of a rapid voltage increase as occurs, for example, in the case of an overvoltage pulse from the grid or in the surge testing of the apparatus, a response should occur at a correspondingly lower breakdown voltage $U_{Z1}$ corresponding preferably to the ignition voltage of the gas discharge tube which is provided without the parallel-connected capacitive element or the capacitor in the circuit arrangement.

Thus, overall, testability of the apparatus in the high-voltage test can be achieved without ignition of the gas discharge tube circuit (failed high-voltage test) in combination with an optimal protective effect of the gas discharge tube against surge pulses from the grid.

According to the invention, an overvoltage protection circuit is thus proposed, for protecting the electronics of a motor, in particular of an EC motor, against overvoltage pulses, which is designed with two protective devices arranged in series connection between two connections, wherein in each case a resistor is connected in parallel to each of the protective devices, and a capacitive element (preferably a capacitor) is provided in parallel connection relative to at least the first protective device, wherein the overvoltage protection circuit between the connections has at least a first (lower) and a second (higher) breakdown voltage point at a voltage $U_{Z1}$ or $U_{Z2}$ depending on the voltage change over time $k=(dU/dt)$ of a voltage $U_{GA}$ at the connections.

Thus, the following relation can be retained:

$U_{Z1}$ for $k \in [k_1, k_2]$, where $[k_1, k_2]$ defines a range of large voltage changes between the values $k_1$ and $k_2$, which in each case defines the range of voltage pulses with steep edge rise;

$U_{Z2}$ for $k \in [k_3, k_4]$, where $[k_3, k_4]$ defines a range of slow voltage changes between the values $k_3$ and $k_4$, which in each case defines the range of a voltage test with flat edge slope (flat voltage ramp).

It is possible to select the ranges in such a manner that in each case only a single value k is used as basis (i.e., $k_1=k_2$, for example), or also to select entire intervals within which the response characteristic of the protective device is ensured.

In a preferred embodiment of the invention, it is provided that each protective device has a voltage-dependent resistor (VR1, VR2) and is insulating below a respective protective device-specific breakdown voltage and, respectively, conductive above the corresponding breakdown voltage.

Moreover, it is provided advantageously that the protective devices are designed as gas discharge tubes, overvoltage arresters or as varistors.

In another preferable design of the invention, in the case of a rapid voltage change of the voltage $U_{GA}$ to the breakdown voltage $U_{Z1}$ (i.e., if k is equal to or greater than a system-specific value $k_{spez}$ within the interval $[k_1, k_2]$), at least one of the two protective devices becomes conductive or an electric arc is ignited.

Furthermore, it is provided advantageously that, in the case of a slow voltage change of the voltage $U_{GA}$ (i.e., if k is smaller than or equal to a system-specific value $k_{spez}$ within the interval $[k_3, k_4]$), one or both protective devices become conductive only when the second (higher) breakdown voltage $U_{Z2}$ is reached or an electric arc is ignited in at least one of the protective devices.

In another preferred embodiment of the invention, it is provided that the overvoltage protection circuit is provided as a series connection of at least two protective devices, preferably protective devices arranged in a row forming a cascade, in each case with a resistor arranged in parallel relative to the respective protective device and/or in each case with a capacitive element arranged in parallel connection.

It is particularly preferable if the capacitive element(s) represent(s) capacitors.

Moreover, according to the invention, an overvoltage protection circuit as described above is provided, which is arranged at the neutral point of a varistor circuit (20) in the input filter (30) of a three-phase supplied EC motor.

Moreover, according to the invention, a method for protecting the electronics of a motor, in particular of an EC motor, against overvoltage pulses by means of an overvoltage protection circuit as described above is provided, wherein the protective devices are designed in particular as gas discharge tubes and, depending on the edge slope of a voltage $U_{GA}$ applied between the corresponding connections, an electric arc is ignited in at least one of the gas discharge tubes, and thus the voltage between the connections is limited to a correspondingly lower burning voltage $U_{Br}$ of the electric arcs in the gas discharge tubes.

In another preferred embodiment of the method according to the invention, it is envisaged that, in the case of a slow increase of the voltage, a high or higher breakdown voltage $U_{Z2}$, with respect to the breakdown voltage $U_{Z1}$, is reached, which preferably corresponds to the sum of the individual ignition voltages of the gas discharge tubes, at which an electric arc is ignited in one of the gas discharge tubes, and, on the other hand, in the case of a rapid increase of the voltage, an electric arc is already ignited, preferably in the two gas discharge tubes immediately in succession, when the lower breakdown voltage $U_{Z1}$ is reached, which preferably corresponds to the ignition voltage of the gas discharge tube (and, in particular, of the gas discharge tube without parallel-connected capacitive element (or capacitor)).

Other advantageous developments of the invention are characterized in the dependent claims or represented in further detail below together with the description of the preferred design of the invention in reference to the figures.

Below, the invention is described in reference to exemplary embodiments, wherein identical reference numerals mark structurally and/or functionally identical features.

Figure 1:
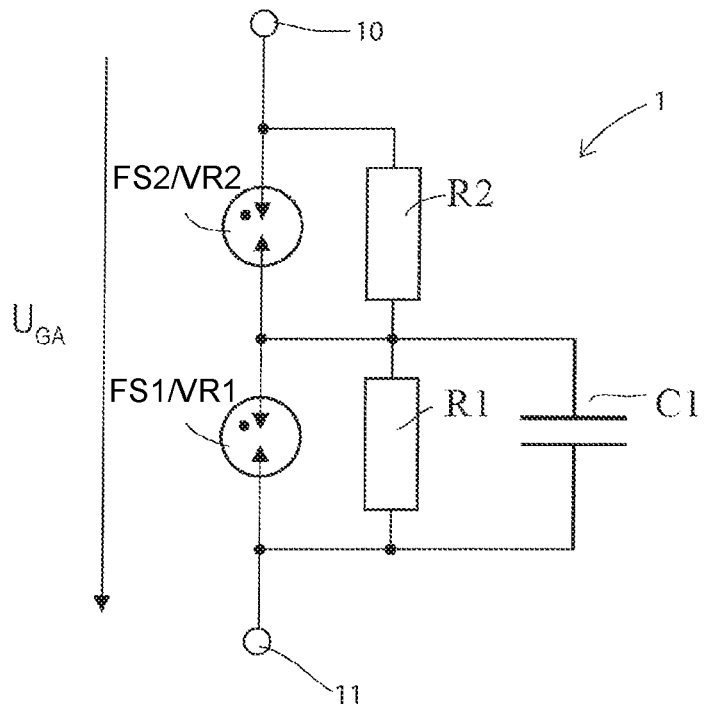
FIG. 1 shows a first embodiment example of an overvoltage protection circuit according to the invention.

In FIG. 1, a first embodiment example of an overvoltage protection circuit 1 according to the invention is shown, which consists of two gas discharge tubes FS1 and FS2, two resistors R1 and R2, and a capacitor C1, wherein the two gas discharge tubes FS1 and FS2 are connected in series, and, in each case, a resistor R1 or R2 is connected in parallel to the gas discharge tubes FS1 or FS2, and the capacitor C1 is connected parallel to the gas discharge tube FS1. The voltage $U_{GA}$ is applied between the connections 10, 20.

Figure 2:
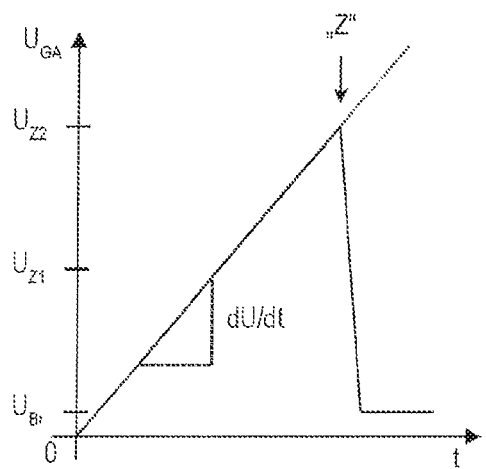
FIG. 2 shows the response characteristic in the case of a slow voltage increase with a high breakdown voltage $U_{Z2}$ and the voltage drop to the burning voltage $U_{Br}$.
Figure 3:
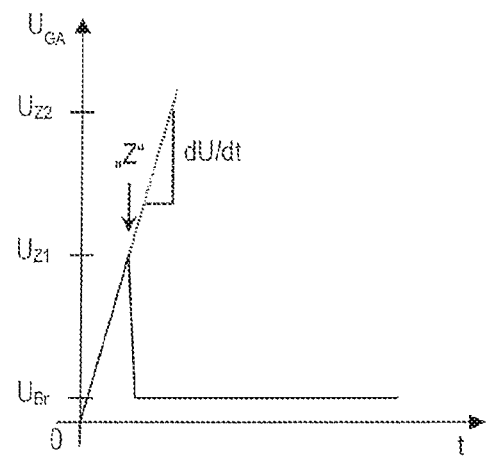
FIG. 3 shows the response characteristic in the case of a rapid voltage increase with a low breakdown voltage $U_{Z1}$ and the voltage drop to the burning voltage $U_{Br}$.

FIG. 2 shows the response characteristic in the case of a slow voltage increase with a high breakdown voltage $U_{Z2}$ and the subsequent voltage drop to the burning voltage $U_{Br}$, and FIG. 3 shows the response characteristic in the case of a rapid voltage increase with a low breakdown voltage $U_{Z1}$ and the voltage drop to the burning voltage $U_{Br}$.

The function of the overvoltage protection circuit 1 consists in controlling the breakdown voltage of the overall arrangement depending on the edge slope of a voltage $U_{GA}$ applied between the connections 10, 20 of the circuit. I.e., the voltage starting at which an electric arc is ignited in one or both gas discharge tubes FS1, FS2, and thus the voltage $U_{GA}$ between the terminals is limited to the correspondingly lower burning voltage $U_{Br}$ of the electric arcs in the gas discharge tubes. In this way, in the case of a slow increase of the voltage $U_{GA}$ according to FIG. 2, as occurs, for example, in a performed high-voltage test of the complete apparatus, a high breakdown voltage $U_{Z2}$ (preferably the sum of the individual ignition voltages of the gas discharge tubes FS1 and FS2) is reached.

On the other hand, in the case of a rapid increase of the voltage $U_{GA}$, as shown in FIG. 3, as occurs, for example, in the case of an overvoltage pulse (surge pulse) from the grid or in the case of the surge testing of the entire apparatus, a correspondingly lower breakdown voltage $U_{Z1}$ is reached. This preferably corresponds to the ignition voltage of the gas discharge tube FS2. Reference numeral "Z" is used to represent the breakdown point of the overvoltage protection circuit 1.

Figure 4:
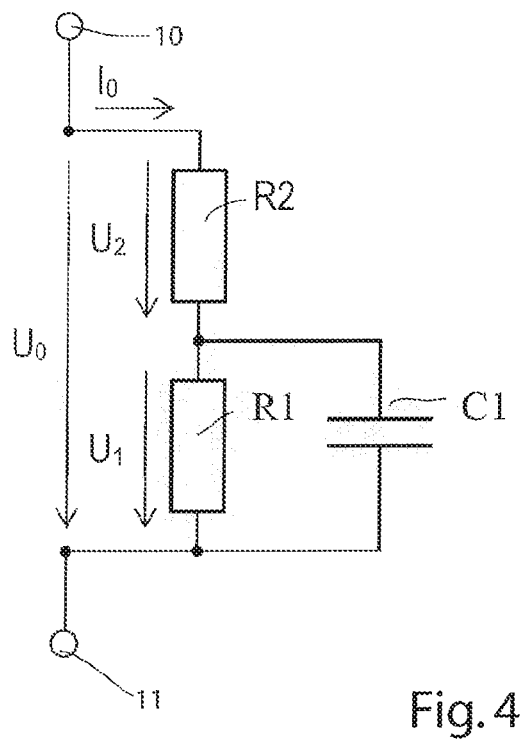
FIG. 4 shows an equivalent circuit diagram of the voltage distribution.

In the unignited state, the gas discharge tubes FS1 and FS2 have almost the same characteristics as a capacitor with very low capacitance. This capacitance can be neglected in case of additional circuit elements dimensioned so as to have sufficient low resistance. Consequently, the distribution of the voltage on the series-connected gas discharge tubes FS1 and FS2 in this state is determined only by the additional circuit, or the gas discharge tubes FS1 and FS2 are in "an idle state." In FIG. 4, as an explanation of the voltage distribution of the voltage, $U_0$ or $U_1$ and $U_2$ is/are represented in the equivalent circuit diagram. Based on this equivalent circuit, the voltage curves over time $U_1$ and $U_2$ at the gas discharge tubes and the ignition voltage of the overall arrangement to be expected therefrom are determined as a function of the edge slope/rise time.

From $$u_1(t)=u_0(t)-u_2(t)=u_0(t)-R_2 \cdot i_0(t)$$

and $$i_0(t) = \frac{u_1(t)}{R_1} + C_1 \cdot \frac{du_1(t)}{dt},$$

one obtains after insertion $$u_1(t) = u_0(t) - \frac{R_2}{R_1} \cdot u_1(t) - R_2 \cdot C_1 \cdot \frac{du_1(t)}{dt},$$

and after rearrangement $$u_0(t) = \left(1 + \frac{R_2}{R_1}\right) \cdot u_1(t) + R_2 \cdot C_1 \cdot \frac{du_1(t)}{dt}$$

By Laplace transformation, one obtains the voltage $U_1$ as $$U_1(s) = \frac{1}{\left(1 + \frac{R_2}{R_1}\right) + R_2 \cdot C_1 \cdot s} \cdot U_0(s) = \frac{R_1}{R_1 + R_2} \cdot \frac{1}{1 + \frac{R_1 \cdot R_2}{R_1 + R_2} \cdot C_1 \cdot s} \cdot U_0(s)$$

Assuming a ramp with edge slope or slope k, one obtains the voltage $U_0$ as:

$$u_0(t) = \begin{cases} 0, t < 0 \\ k \cdot t, t \geq 0 \end{cases} \overset{Laplace}{\Longleftrightarrow} U_0(s) = \frac{k}{s^2}$$

and thus the resulting voltage $U_1$ as $$U_1(s) = k \cdot \frac{R_1}{R_1 + R_2} \cdot \frac{1}{\left(1 + \frac{R_1 \cdot R_2}{R_1 + R_2} \cdot C_1 \cdot s\right) \cdot s^2} = k \cdot \frac{R_1}{R_1 + R_2} \cdot \frac{1}{(1 + \tau \cdot s) \cdot s^2}$$

where $\tau = \frac{R_1 \cdot R_2}{R_1 + R_2} \cdot C_1$

Using the following Laplace correspondence $$u_0(t) = \tau \cdot e^{-\frac{t}{\tau}} + t - \tau \overset{Laplace}{\Longleftrightarrow} U_0(s) = \frac{1}{(1 + \tau \cdot s) \cdot s^2}$$

one gets the voltage $U_1$ in the time domain as $$u_1(t) = k \cdot \frac{R_1}{R_1 + R_2} \cdot \left(\tau \cdot e^{-\frac{t}{\tau}} + t - \tau\right)$$

The voltage $U_2$ is thus obtained according to the following formula:

$$u_2(t) = k \cdot \left(t - \frac{R_1}{R_1 + R_2} \cdot \left(\tau \cdot e^{-\frac{t}{\tau}} + t - \tau\right)\right)$$

-continued $$\frac{u_0(t)}{u_2(t)} = \frac{1}{1 - \frac{R_1}{R_1 + R_2} \cdot \left(\frac{\tau}{t} \cdot e^{-\frac{t}{\tau}} + 1 - \frac{\tau}{t}\right)}$$

or with time normalized to the RC time constant τ, as $$\frac{u_0(t^*)}{u_2(t^*)} = \frac{1}{1 - \frac{R_1}{R_1 + R_2} \cdot \left(\frac{1}{t^*} \cdot e^{-t^*} + 1 - \frac{1}{t^*}\right)} \text{ with } t^* = \frac{t}{\tau}$$

Figure 5:
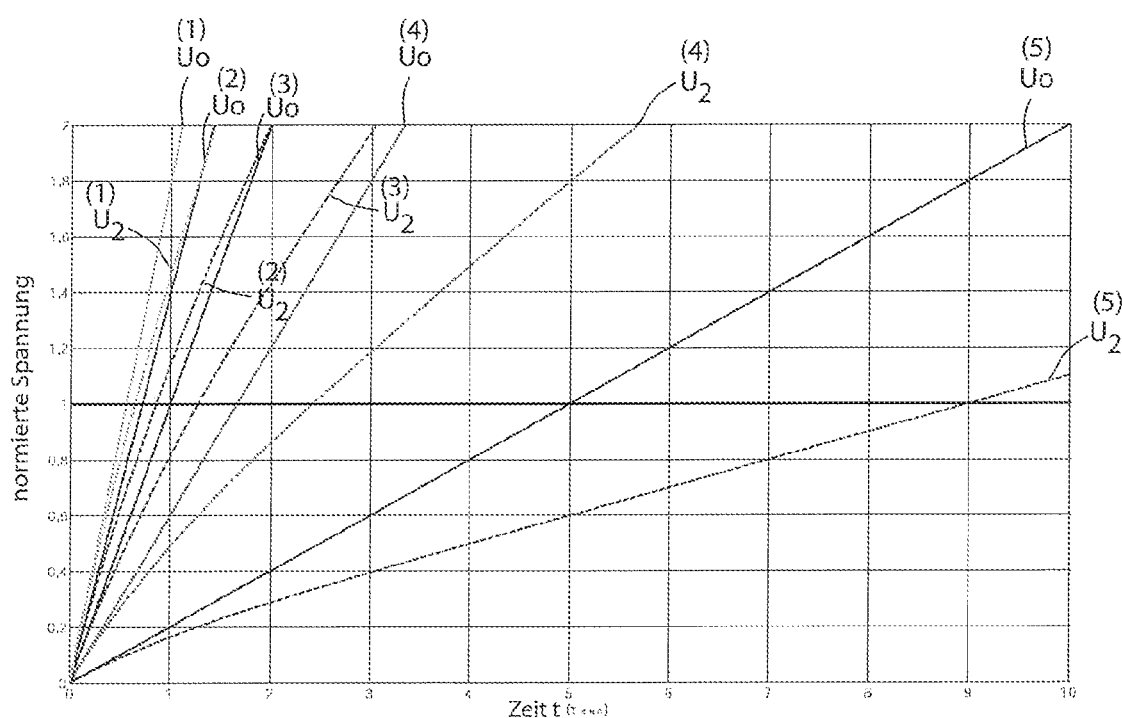
FIG. 5 shows the voltage characteristic of the voltage $U_2$ from FIG. 4 versus the total voltage.

Accordingly, from FIG. 5 one gets the voltage curve of the voltage $U_2$ from the in relation to the total voltage $U_0$. The curve over time of the voltages $U_0$ and $U_2$ for different rise times and a respective symmetric dimensioning of the resistors R1 and R2 (R1=R2) is represented.

Figure 6:
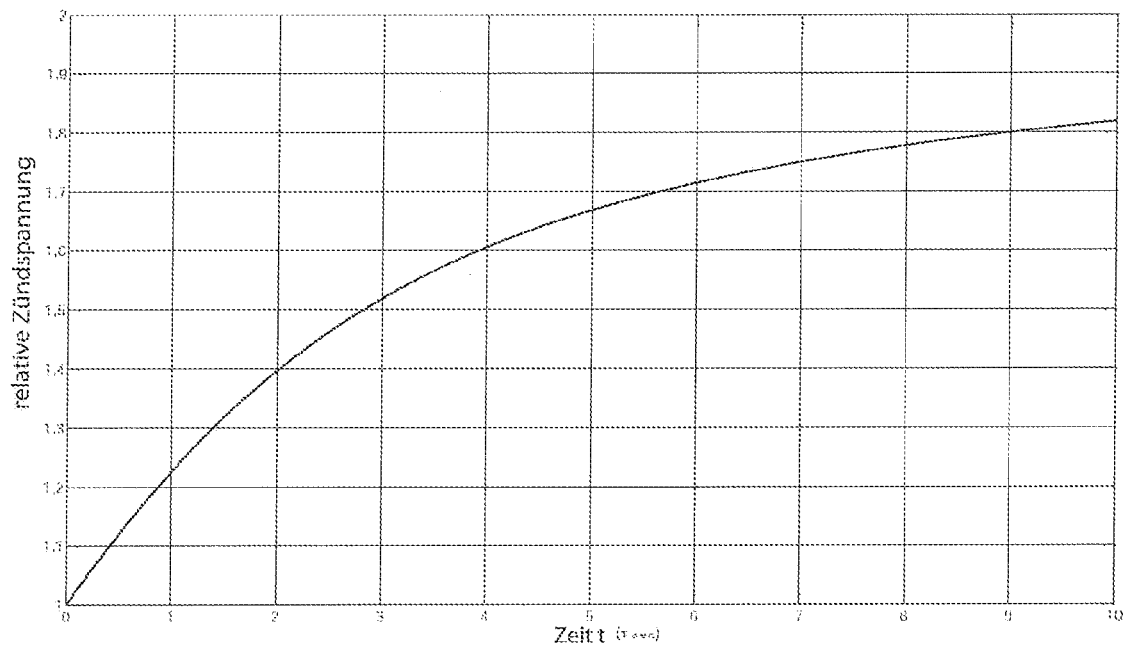
FIG. 6 shows the curve of the ignition voltage of the protection circuit with respect to the ignition voltage of the second gas discharge tube as a function of the rise time of the applied voltage in the case of symmetric dimensioning of the parallel resistors.

The curve of the ignition voltage of the protection circuit with respect to the ignition voltage of the second gas discharge tube FS2 as a function of the rise time of the applied voltage $U_0$ with symmetric dimensioning of the parallel resistors R1 and R2 (R1=R2) can be obtained from FIG. 6. After the ignition of the gas discharge tube FS2, the voltage drop $U_1$ is determined only by its burning voltage $U_{Br}$. In an idealized fashion, one can assume a short circuit here. Thus, below, the result is that the voltage $U_2$ is equal to the voltage $U_0$ which was already high enough to ignite the gas discharge FS2, and which is consequently now also sufficient for the direct ignition of the gas discharge tube FS1. Therefore, the two gas discharge tubes FS1 and FS2 are ignited immediately after the ignition voltage on the gas discharge tube FS2 is reached. The total voltage at which the gas discharge tube FS2, and consequently also the gas discharge tube FS1, is ignited is determined by the rise time of the voltage applied to the overall arrangement in relation to the time constant of the additional circuit, whereby the response characteristic according to the invention can be achieved.

Figure 7:
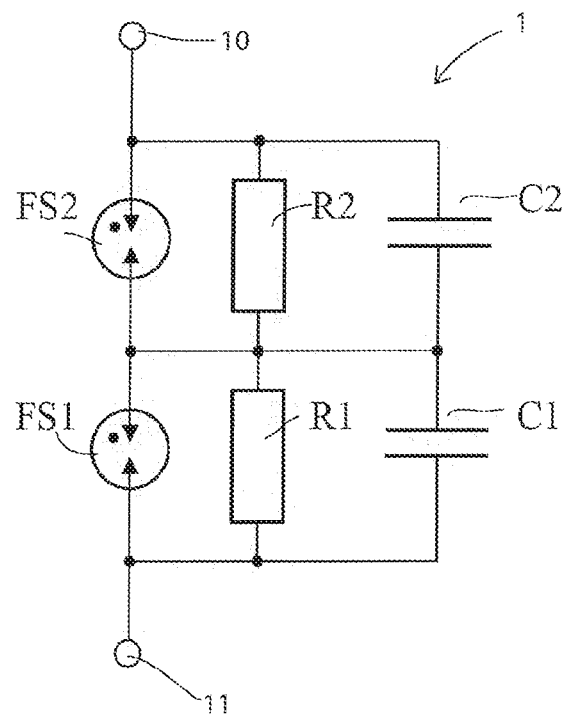
FIG. 7 shows a second embodiment example of an overvoltage protection circuit according to the invention.
Figure 8A:
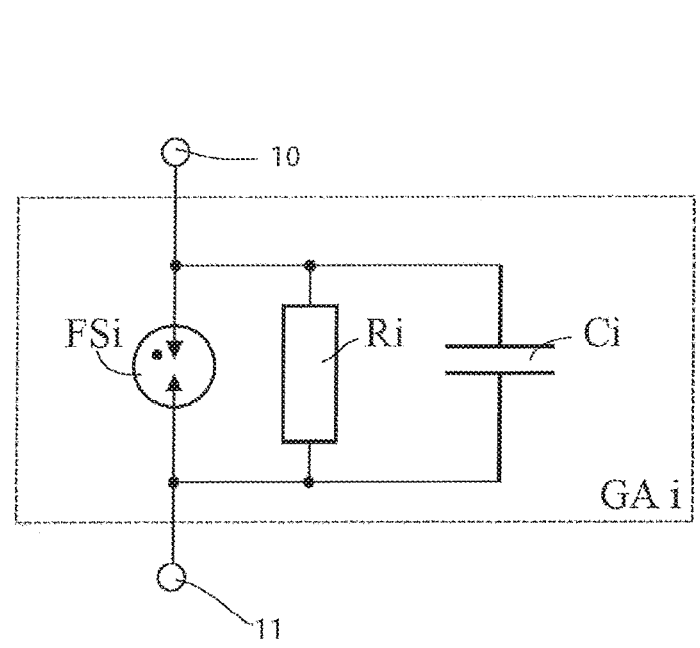
FIG. 8a shows a detail of the circuit from FIG. 8.
Figure 8:
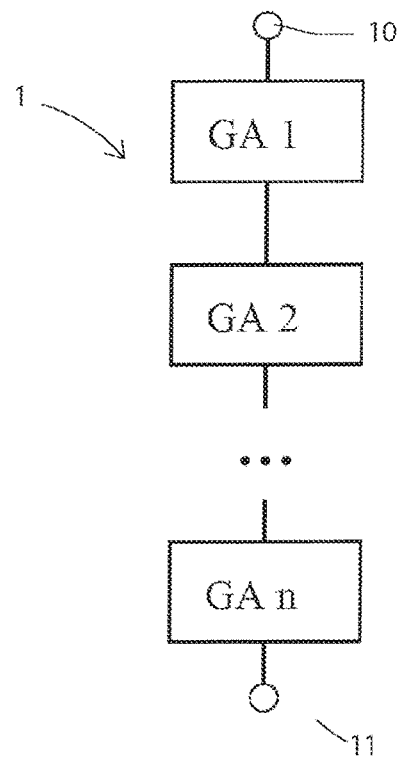
FIG. 8 shows a third embodiment example of an overvoltage protection circuit according to the invention.

In FIG. 7, a second embodiment example of an overvoltage protection circuit 1 according to the invention is shown, and in FIG. 8, a third embodiment example of an overvoltage protection circuit 1 according to the invention is shown. The overvoltage protection circuit 1 according to FIG. 7 differs from the first embodiment example according to FIG. 1 in that, furthermore, a capacitor C2 is connected in parallel to the gas discharge tube FS2, while in FIG. 8 there is an overvoltage protection circuit 1 by means of a cascading arrangement of two to n circuits GAi according to FIG. 8a, which in each case consist of gas discharge tubes FSi (FS1, FS2, . . . FSn) with parallel resistor Ri (R1, R2, . . . , Rn) and/or in each case parallel-connected capacitor Ci (C1, C2, . . . , Cn).

Figure 9:
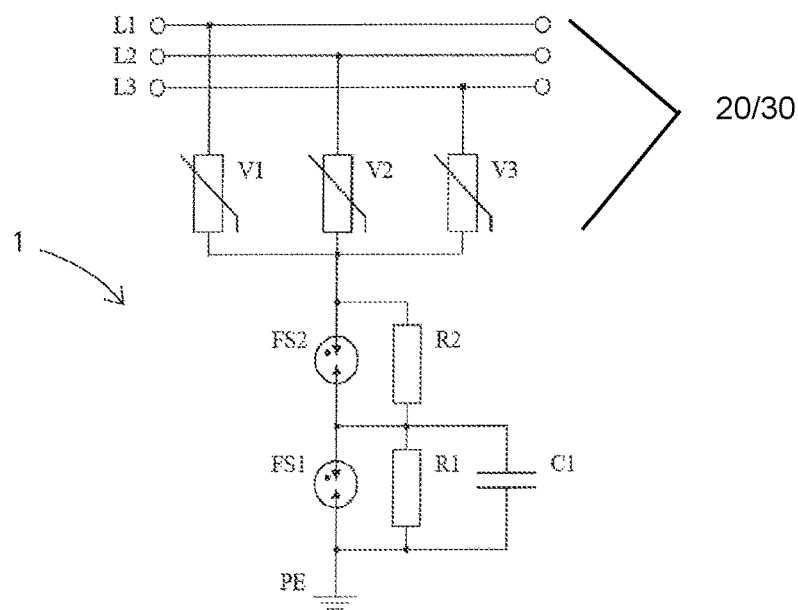
FIG. 9 shows an arrangement of the protection circuit according to FIG. 1 at the neutral point of a varistor circuit (20) in the input filter (30) of a three-phase supplied EC motor.

FIG. 9 shows an arrangement of the overvoltage protection circuit 1 according to the invention according to FIG. 1 at the neutral point of a varistor circuit (20) in the input filter (30) of a three-phase supplied EC motor.

The design of the invention is not limited to the above-indicated preferred embodiment examples. Instead, many variants are conceivable, which make use of the solution represented even in designs of fundamentally different types.

The invention claimed is:

1. An overvoltage protection circuit for protecting the electronics of a motor, in particular of an EC motor, against overvoltage pulses, the overvoltage protection circuit comprising:

two protective devices (FS1, FS2) which are arranged in series connection between two connections, wherein a resistor (R1) or (R2) is connected in parallel to each of the protective devices (FS1, FS2) and at least one capacitive element (C1) is provided in parallel connection to the first protective device (FS1), wherein the overvoltage protection circuit has, between the connections, at least a first lower and a second higher breakdown voltage point at a voltage $U_{Z1}$ or $U_{Z2}$ dependent on the voltage change over time k=(dU/dt) of a voltage $U_{GA}$ at the connections, wherein each protective device (FS1, FS2) has a voltage-dependent resistor and is insulating below a respective protective device-specific breakdown voltage and, respectively, is conductive above the corresponding breakdown voltage;

wherein the protective devices (FS1, FS2) are designed as gas discharge tubes, overvoltage arresters or varistors;

wherein in the case of a rapid voltage change of the voltage $U_{GA}$ to the breakdown voltage $U_{Z1}$, wherein, if k is greater than a system-specific value $k_{spez}$, at least one of the two protective devices (FS1, FS2) becomes conductive or an electric arc is ignited; and wherein in the case of a slow voltage change of the voltage $U_{GA}$, wherein, if k is smaller than a system-specific value $k_{spez}$, one or both protective devices (FS1, FS2) become conductive only when the second higher breakdown voltage $U_{Z2}$ has been reached or an electric arc is ignited in at least one of the protective devices (FS1, FS2).

2. The overvoltage protection circuit according to claim 1, wherein a series connection of at least two protective devices (FS1, FS2, . . . FSn) is provided, wherein in each case with a parallel resistor (R1, R2, . . . , Rn) arranged relative to the respective protective device (FS1, FS2, . . . FSn) and/or a capacitive element (Cl, C2, . . . , Cn) arranged in each case in parallel connection.

3. The overvoltage protection circuit according to claim 1, wherein the capacitive elements(s) (C1, C2, . . . , Cn) represent(s) a capacitor.

4. The overvoltage protection circuit according to claim 1, wherein said overvoltage protection circuit is arranged at the neutral point of a varistor circuit in the input filter of the EC motor.

5. A method for protecting the electronics of a motor, in particular of an EC motor, against overvoltage pulses by means of an overvoltage protection circuit according to claim 1, providing the protective devices (FS 1, FS2) designed as gas discharge tubes, and, depending on the edge slope of a voltage $U_{GA}$ applied between the connections, igniting an electric arc in at least one of the gas discharge tubes (FS1, FS2), and limiting the voltage between the connections to a corresponding lower burning voltage $U_{Br}$ of the electric arcs in the gas discharge tubes.

6. The method according to claim 5, wherein, in the case of a slow increase of the voltage, a high or higher breakdown voltage $U_{Z2}$, with respect to the breakdown voltage $U_{Z1}$, is reached, which preferably corresponds to the sum of the individual ignition voltages of the gas discharge tubes (FS1, FS2), igniting an electric arc is ignited in one of the gas discharge tubes, and, on the other hand, in the case of a rapid increase of the voltage, igniting an electric arc, preferably in the two gas discharge tubes (FS1, FS2) immediately in succession, when the lower breakdown voltage $U_{Z1}$ is reached, which preferably corresponds to the ignition voltage of the gas discharge tube (FS2) without parallel-connected capacitive element (C1).

* * * * *